Oct. 18, 1932.   A. THOMA   1,883,104
TOOL FOR LAYING SHOE FILLER
Filed March 31, 1931   2 Sheets-Sheet 2
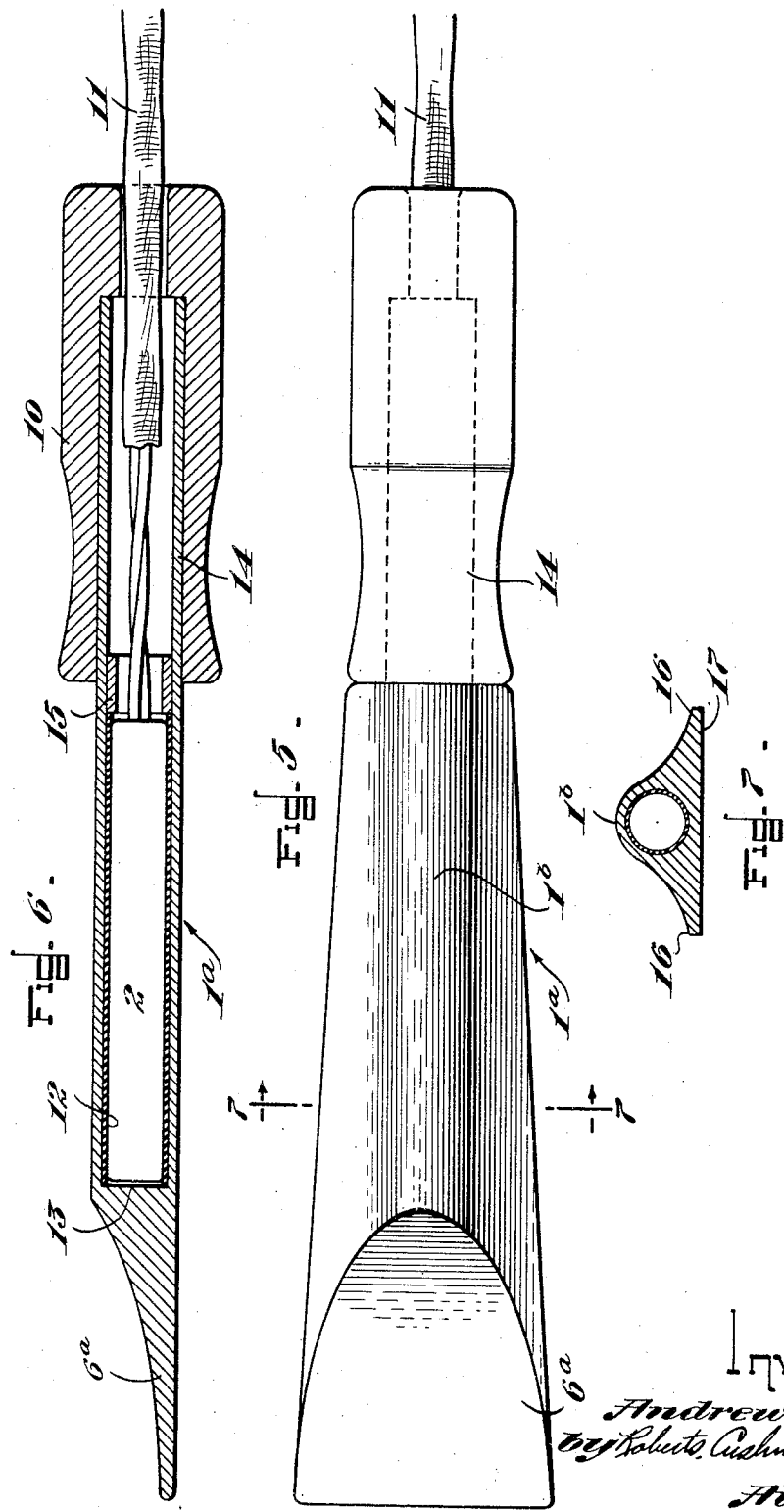

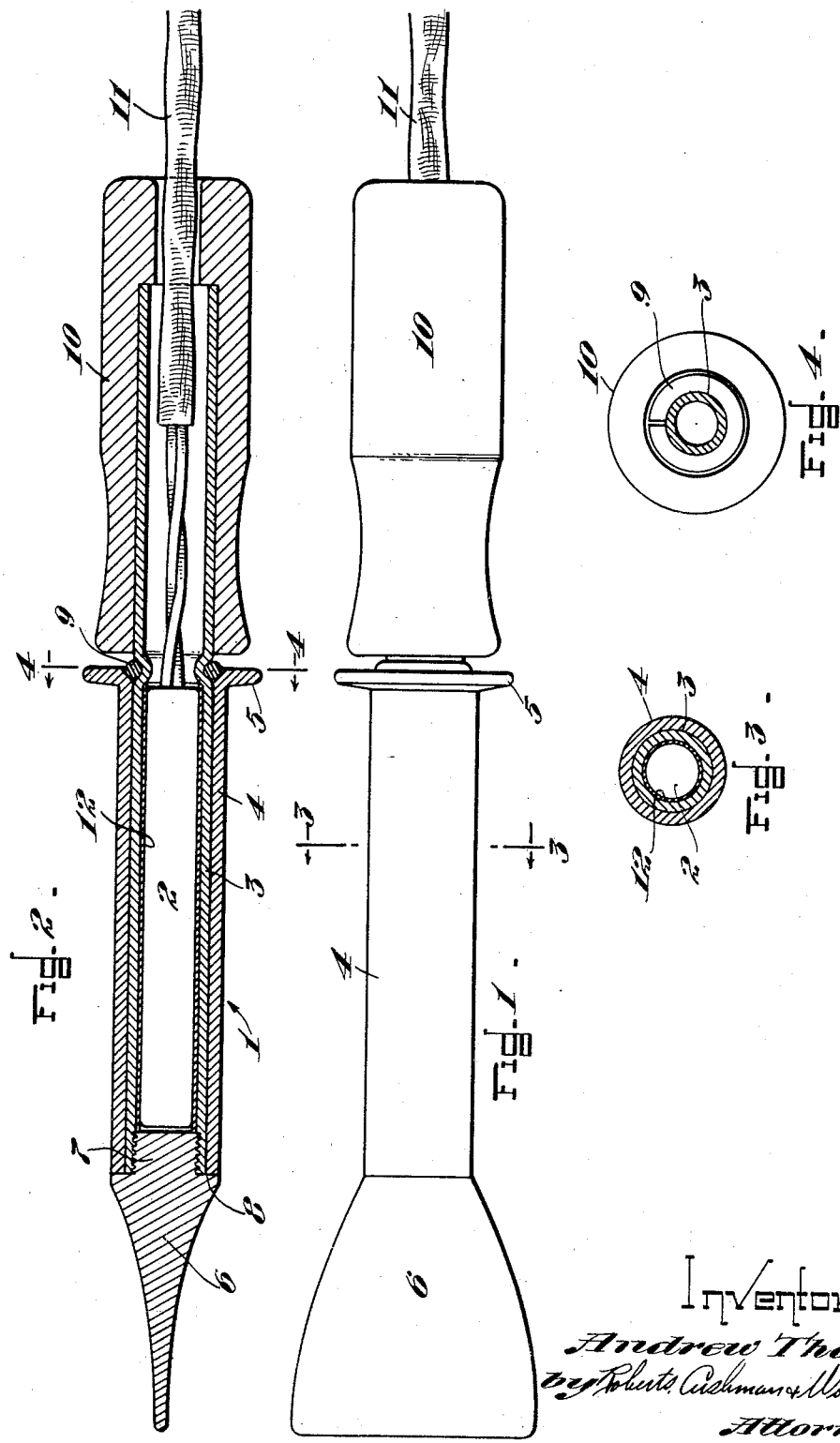

Patented Oct. 18, 1932

1,883,104

UNITED STATES PATENT OFFICE

ANDREW THOMA, OF CAMBRIDGE, MASSACHUSETTS, ASSIGNOR TO NORTH AMERICAN CHEMICAL COMPANY, OF CAMBRIDGE, MASSACHUSETTS, A CORPORATION OF MASSACHUSETTS

TOOL FOR LAYING SHOE FILLER

Application filed March 31, 1931. Serial No. 526,599.

This invention relates to tools for filling the bottom cavities of shoes with plastic shoe filler of the character described in a series of patents granted to the present applicant, Andrew Thoma, consisting mainly of a comminuted body material, such as ground cork, and a sticky binder, such as wax tailings. Such shoe filler when furnished to the shoe manufacturer in bulk form is usually preconditioned for use by heat and moisture in a suitable machine furnished for that purpose, and the operator then dips or scoops up from the mass, by means of a tool or spatula somewhat resembling a putty knife, a quantity of the filler suitable for filling a single shoe bottom cavity, then deposits it in the cavity and then spreads it throughout the cavity in somewhat the same manner as a mason lays mortar with a trowel. The blade of the tool is usually heated both to render the plastic filler more fluid and easily spreadable and to prevent the filler from sticking to the tool. Examples of tools for performing this work are described in my Patent No. 878,688, dated February 11, 1908 and in my Patent No. 808,227, dated December 26, 1905.

The present invention has to do with certain improvements in tools of the kind referred to by the use of which the work of filling shoes by hand may be substantially improved in quality, efficiency and speed. In the new tool, instead of using the blade both for dipping up the plastic shoe filler and for spreading and molding it within the shoe bottom cavity as heretofore, I have provided two distinct elements, namely, a scoop or blade at the end of the tool opposite the handle for dipping up and depositing a measured quantity of filler in the cavity and an intermediate molding member between the scoop and the handle for spreading and molding the filler in the cavity. The scoop is generally thin and flat and is designed for holding the correct quantity of filler for a single shoe bottom cavity. It may also preferably be made detachable and interchangeable with other scoops of other sizes appropriate for different classes of work presenting different size cavities. The intermediate molding member is provided with a cylindrical or rounded molding surface for spreading, molding and smoothing the filler in the shoe bottom cavity and may preferably consist of a rotating cylindrical shell which spreads, molds and smooths the filler in the cavity by a rolling action. The intermediate molding member is made hollow and is provided with an electrical heating unit by which the molding member is heated. The scoop, although not directly heated by an internal heating unit, is suitably heated by conduction from the intermediate member in which the heating unit is housed.

In the accompanying drawings which illustrate certain embodiments of the invention Fig. 1 is a plan view of one form of tool for laying shoe filler;

Fig. 2 is a central longitudinal section of the tool shown in Fig. 1;

Fig. 3 is a section on line 3—3 of Fig. 1;

Fig. 4 is a section on line 4—4 of Fig. 2;

Fig. 5 is a plan view of another form of tool embodying certain modifications of the invention;

Fig. 6 is a central longitudinal section of the tool shown in Fig. 5; and

Fig. 7 is a section on line 7—7 of Fig. 5.

In the embodiment of the invention shown in Figs. 1 to 4 inclusive the body of the intermediate spreading and molding member is indicated generally at 1, and at 2 is shown an electrical heating unit mounted within the molding member. The body 1 comprises an inner metal tube 3, which constitutes a casing or housing for the heating unit, and a cylindrical, tubular roll or shell 4 rotatably mounted on the casing 3 and provided at its inner end nearest the handle with a flange 5 to bear against the side of a shoe and act as a guide for the tool in its movements back and forth in the spreading and molding of the filler layer in the shoe bottom cavity.

At the end of the body 1 opposite the handle is secured a comparatively thin and generally flat scoop 6, formed at its inner end with a threaded boss 7 which is screwed tightly into the interiorly threaded end of casing 3. Thus the scoop is fixed to the tool and does not rotate with the roll 4. The scoop 6 may be varied in size and shape and may be readily interchanged with other scoops for different classes of work. The roll 4 is held against axial movement on the casing 3 by means of an annular shoulder 8 on the scoop 6 and a split ring 9 which is sprung into position in an annular groove provided upon the exterior of casing 3.

The rear end of casing 3 extends beyond the tubular roll 4 into the bore of a handle 10 which is preferably made of wood or other non-heat-conducting material. The circuit wires for the electrical heating unit 2 are contained in a cord or cable 11 which enters through the bore of the handle 10 and extends through the rear end of the casing 3 to the terminals of the heating unit 2. The heating unit 2 may be electrically insulated from the casing 3 if desired by a tubular sheath 12 of mica or the like.

In the embodiment of the invention illustrated in Figs. 5 to 7 inclusive the intermediate molding member, indicated generally at 1ª, is shown as made of a single piece of metal formed interiorly with a chamber 13 in which is contained the electrical heating unit 2 insulated as in the other form, if desired, from the metal body 1ª by a sheath of mica 12. At its rear or inner end the molding member 1ª is made with an integral tubular extension 14 which extends into the bore of the wooden handle 10. The circuit wires for the electrical heating unit 2 enter through the bore of the handle 10 and the shank 14 and are connected to the terminals of the heating unit 2 within the hollow of the member 1ª. A short bushing 15 may be forced into position within the hollow of the member 1ª to hold the heating unit 2 against endwise displacement.

The working side of the intermediate molding member 1ª is provided with a rounded, generally cylindrical working surface 1ᵇ for spreading, molding and smoothing the filler layer in the shoe bottom cavity as the tool is moved by hand back and forth across it.

At its outer end opposite to the handle the molding member is formed with a relatively thin and generally flat scoop 6ª. As shown in the drawings the scoop is made integral with the molding member but it could obviously be made detachable and interchangeable as shown in Figs. 1 and 2. The opposite side edges of the molding body are extended or broadened into wing-like structures 16 to provide a flat surface 17 opposite to the rounded molding surface 1ᵇ. This flat surface 17 may be used if desired in the final smoothing of the filler layer after it has been spread and molded into the shoe bottom cavity.

In both forms illustrated the intermediate molding member is provided with a rounded, generally cylindrical surface, in one form, Figs. 1 and 2, this surface being rotatable on an axis extending longitudinally of the tool and in the other form, Figs. 5 and 6, the surface being non-rotatable or stationary. If the comminuted or granular body material of the filler is comparatively coarse the rotatable molding member is recommended. If, on the other hand, the granulated body material of the filler is relatively fine the fixed or non-rotating rounded molding member may be used.

In operation the workman dips up from the conditioned filler mass a quantity of shoe filler by means of the scoop 6 or 6ª and deposits it in the bottom cavity of the shoe to be filled. He then presses it down, spreads and molds it in the shoe bottom cavity by means of the rounded surface of the intermediate molding member which rests on the wall of the cavity formed by the welt, in the case of a Goodyear welt shoe, or on the inturned edge of the upper, in the case of a McKay shoe, and spreads and presses the filler down in the cavity to the level of the surrounding walls by a rolling or wiping action, as the case may be.

I claim:

1. A tool for laying shoe filler in shoe bottom cavities, comprising a handle at one end, a scoop at the opposite end, an intermediate member connecting the handle and the scoop, and a rotatable molding member on the intermediate member.

2. A tool for laying shoe filler in shoe bottom cavities, comprising a handle at one end, a scoop at the opposite end, an intermediate member connecting the handle and the scoop, and a rotatable molding member mounted on the intermediate member on an axis longitudinal of the tool.

3. A tool for laying shoe filler in shoe bottom cavities, comprising a handle at one end, an intermediate member fixed to one end of the handle and having a rounded molded surface, and a scoop detachably secured to the intermediate member at the end opposite to the handle.

4. A tool for laying shoe filler in shoe bottom cavities, comprising a handle at one end, an intermediate member fixed to one end of the handle, a rotatable molding member on the intermediate member, and a scoop detachably secured to the intermediate member at the end opposite to the handle.

5. A tool for laying shoe filler in shoe bottom cavities, comprising a handle at one end, a hollow casing fixed to the handle and projecting from one end thereof, an electrical heating unit within the casing, a molding member having a rounded molding surface outside of said casing, and a scoop detachably secured to said casing at the end opposite to the handle.

6. A tool for laying shoe filler in shoe bottom cavities, comprising a handle at one end, a hollow casing fixed to the handle and projecting from one end thereof, an electrical heating unit within the casing, and a rotatable molding member surrounding said casing.

7. A tool for laying shoe filler in shoe bottom cavities, comprising a handle at one end, a hollow casing fixed to the handle and projecting from one end thereof, an electrical heating unit within the casing, a scoop fixed to the casing at the end opposite to the handle and a rotatable molding member surrounding said casing.

8. A tool for laying shoe filler in shoe bottom cavities, comprising a handle and a molding member rotatable on an axis longitudinal of the tool, said rotatable molding member having a guiding flange at one end.

Signed by me at Boston, Mass., this 28th day of March 1931.

ANDREW THOMA.